No. 841,129. PATENTED JAN. 15, 1907.
R. M. DIXON.
STEAM TRAP.
APPLICATION FILED FEB. 20, 1905.
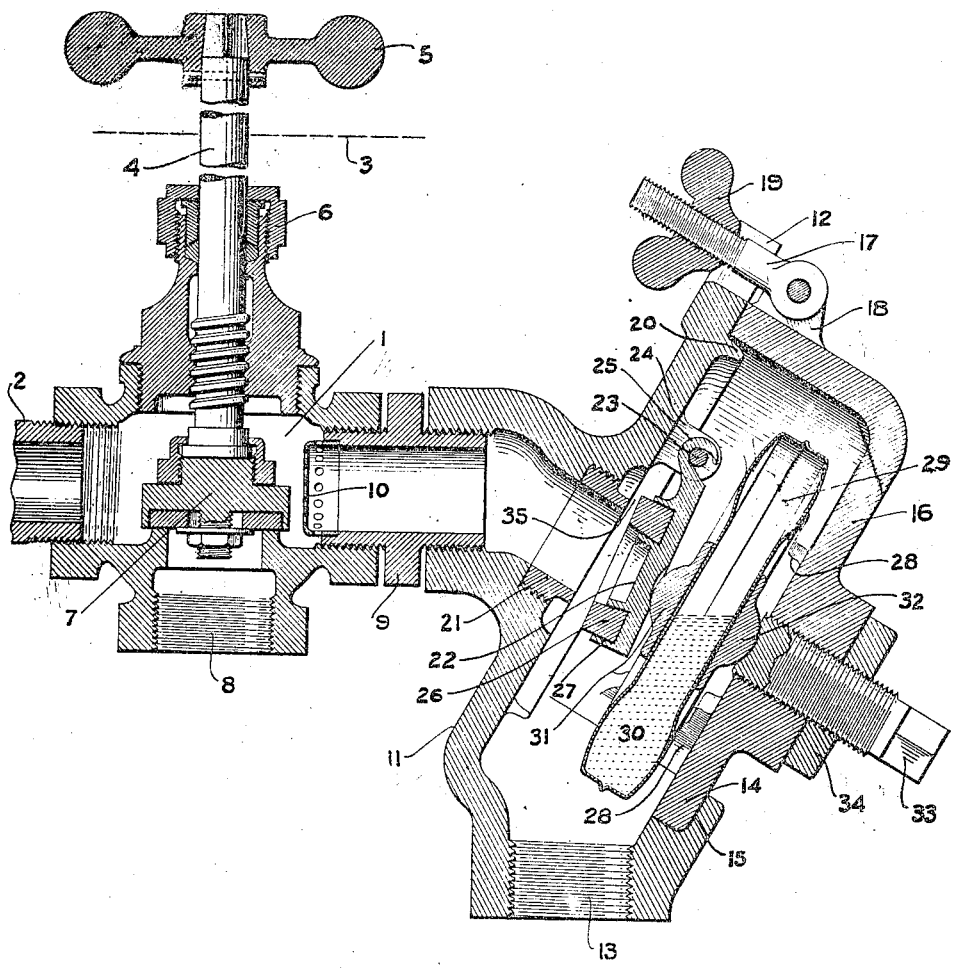
WITNESSES:
INVENTOR
BY
ATTORNEYS

UNITED STATES PATENT OFFICE.

ROBERT M. DIXON, OF EAST ORANGE, NEW JERSEY, ASSIGNOR TO THE SAFETY CAR HEATING & LIGHTING COMPANY, OF NEW YORK, N. Y., A CORPORATION OF NEW JERSEY.

STEAM-TRAP.

No. 841,129.   Specification of Letters Patent.   Patented Jan. 15, 1907.

Application filed February 20, 1905. Serial No. 246,469.

*To all whom it may concern:*

Be it known that I, ROBERT M. DIXON, residing at East Orange, in the county of Essex and State of New Jersey, have invented certain new and useful Improvements in Steam-Traps, of which the following is a full, clear, and exact description, such as will enable others skilled in the art to which it appertains to make and use the same.

This invention relates, broadly, to valves and to controlling means for the same, and more specifically to automatically-controlled valves and to steam-traps.

One of the objects thereof is to produce a device of the above type having a higher degree of general efficiency than has heretofore been attained.

Another object is to increase the durability of such devices.

Another object is to provide a device of the nature of a steam-trap which may be readily taken apart or adjusted.

Another object is to provide a device of the above general nature which will be certain and economical in action and compact in structure.

Other objects will be in part obvious and in part pointed out hereinafter.

The invention accordingly consists in the features of construction, combinations of elements, and arrangement of parts which will be exemplified in the herein-described apparatus and the scope of the application of which will be indicated in the following claims.

The accompanying drawing is a sectional elevation of one of various possible embodiments of my invention.

As conducing to a better understanding of certain features of my invention, it may be here noted that in devices of the nature of steam-traps when the drainage-water ceases to fill the entire passage through the valve there is often a considerable waste of live steam from the system with which the trap is connected; also, unless provision is made for such a contingency the partial vacuum which is formed by the condensation of the steam results in the valve being prematurely snapped into closed position. Moreover, I have found that unless the several parts are readily separable and adjustable the maintenance of the trap in a satisfactorily operative condition is a constant source of care and annoyance. The above and other defects are remedied in constructions of the nature of that hereinafter described.

Referring now to the illustrative embodiment of my invention shown in the accompanying drawing, 1 represents a cross-valve in piping 2, mounted upon the car-body or other structure, the position of which is diagrammatically indicated at 3, this invention being particularly adapted for use in connection with the steam-heating system of railway-cars, although possessing marked value in other relations. As valve 1 is of the ordinary construction and as its specific details do not concern the present invention, it may be noted here merely that the same comprises a spindle 4 of such suitable length as to carry the hand-wheel 5 into the desired position, this spindle passing through a suitable stuffing-box 6 and having mounted upon its lower end the valve proper, 7, above an outlet 8.

Tapped into the valve 1 is a union 9, having fixed therein a sieve or screen 10 for a purpose hereinafter described. Upon the other end of union 9 is a threaded casing 11, preferably of substantially the form indicated and comprising, broadly, a body having upwardly-projecting lugs, one of which is shown at 12, and a downwardly-extending outlet 13. Interlocking with this casing, as by means of a tongue 14 and socket 15, is a cap 16, normally held in closed position by means of an eyebolt 17, pivotally mounted thereon between a pair of lugs, one of which is indicated at 18. Tapped upon this eyebolt is a wing-nut 19, adapted to rest between the lugs 12 and securely hold the cap against the casing, a shoulder 20 being formed upon the body thereof in order to aid in maintaining the cap in its proper relative position.

Within the body portion of the casing 11 is tapped a bushing 21, forming a seat for a valve 22. The latter member is pivotally mounted upon a pin 23, affixed in a plane above the valve to a pair of lugs, one of which is shown at 24. The connection between valve 22 and pin 23 comprises a hook 25 of such shape as readily to permit the valve to swing with reference to the casing and yet to prevent the same becoming detached unless turned to a considerable angle with reference thereto. When thrown into this extreme position, however, the valve may be readily removed, as hereinafter described. Valve 22 is provided upon its inner surface with a gasket 26 of any desired composition fitted within a swaged recess 27 and adapted to coact with valve-seat 21, as will be clear from the drawing.

Mounted within the cap 16 and resting upon a number of ribs 28, shaped so as to form seats for the same, is a thermostat 29, formed of resilient metal and containing a volatile fluid 30. As the specific construction of this thermostat forms no part of the present invention and it acts in a well-known manner to vary its external shape in accordance with the degree of temperature to which the fluid therein is exposed, its form will not be described in detail. The lower end of the thermostat, it may be noted, projects within the path of drainage discharged through the valve 22, and thus is exposed to direct contact therewith, this arrangement adding materially to the sensitive action of the trap. It may also be noted that on account of the inclined position of the thermostat the chance of accumulation of drainage-water thereon, with a consequent decrease in efficiency, is avoided.

Thermostat 29, by means of the bosses 31 and 32, rests in contact with the valve 22 and an adjusting-screw 33, tapped through the outer wall of the cap 16, as shown in the drawing, and preferably provided with a lock-nut 34 in order to render its action more certain.

It is an important feature of this invention that the valve, valve-seat, and thermostat are mounted in a position inclined with respect to the vertical when in operative position, as is indicated by the drawing. By reference in the following claims to a part as "inclined" without further limitation is meant that the same is inclined with respect to the vertical when mounted in its operative position. Among the advantages of this inclination of the parts is that the chance of premature closing to the valve above referred to is reduced to a minimum without sacrifice of other advantageous features.

In order to avoid any ambiguity as to the use of certain terms employed throughout this description and the following claims, it may here be noted that they are intended to have the following meanings: By "thermostat" is meant any device adapted, upon being exposed to a change of temperature, to undergo a corresponding change in external shape. By "operative portions," as used with reference to the valve or valve-seat, is intended those portions which are adapted to contact the coacting member, and thus render the device operative.

The method of use and operation of the above-described apparatus is substantially as follows: Assuming that the cross-valve 1 is in operative relation to a steam-heating system mounted upon the structure 3, the steam having a free passage through the screen 10 and the partially open valve 22 will fill the chamber formed by the casing 11 and cap 16 and rapidly heat the thermostat 29. The latter device quickly expanding in response to this increase of temperature forces the valve into a closed condition until the water of condensation has accumulated above the same to such an extent as, by shielding the thermostat from the heat of the steam, to cause the same to contract, and thus throw open the valve. The drainage-water then readily escapes through the valve, the majority of the same passing through the widely-open lower portion of the passage, the escape of steam through portion 35, when the level of the water has fallen to such a point as to leave a free passage therethrough, being rendered insignificant in amount, since owing to the swinging action of the depending valve 22 this opening is relatively small. When the water is entirely discharged, the action of the steam on the thermostat 29 causes a quick closing of the valve, as above pointed out. This cycle of operations is repeated whenever sufficient drainage-water has accumulated to render such action desirable. When the connection with the stream-heating system is broken, as by "cutting out" the car, the thermostat will become cooled and open the trap, thereby preventing freezing of the water of condensation.

The function of the sieve or screen 10, as should be apparent from the drawing, is to prevent the entry of foreign matter within the trap proper, with a consequent tendency to cut the faces of the valve or valve-seat or by lodgment between the parts to interfere with the fine adjustment of the trap.

The hand-valve may be used to blow out the drainage-water at will in the remote event that the automatic trap becomes inoperative, and, if desired, the outlet of the hand-valve may be formed so as to direct its discharge against the outer walls of the trap to thaw the same should the parts become frozen in position.

It will thus be seen that I have provided a device which is well adapted to accomplish the objects of my invention. The several parts are of the simplest and most inexpensive construction, and the chances of the same becoming deranged in use are reduced to a minimum. No spring, with its consequent element of uncertainty, is depended upon to aid in opening or closing the valve, and the adjustment of both trap and thermostat may be accomplished without inconvenience or waste of time. The several parts, moreover, are readily detachable, the cap being removed by simply loosening the wing-nut 19 and swinging the eyebolt from its position between lugs 12. As the thermostat 29 merely rests upon the ribs 28, the same may then be taken from its position in the cap without further manipulation of the parts and may be adjusted or replaced, as desired. With the cap removed, moreover, the valve 22 may be instantly detached, being merely swung back from the casing and unhooked from pin 25.

The entire structure is compact, simple, and durable, possessing features which are of considerable independent value in other relations and which when jointly embodied, as in the structure described, result in a trap which possesses many advantages, some of which have been suggested, some of which will be obvious, and others of which will become clear in the light of a full knowledge of the hard practical conditions to which these devices are subjected in use.

As many changes could be made in the above construction and many apparently widely different embodiments of my invention could be made without departing from the scope thereof, I intend that all matter contained in the above description or shown in the accompanying drawings shall be interpreted as illustrative and not in a limiting sense.

I desire it also to be understood that the language used in the following claims is intended to cover all of the generic and specific features of the invention herein described and all statements of the scope of the invention which, as a matter of language, might be said to fall therebetween.

Having described my invention, what I claim as new, and desire to secure by Letters Patent, is—

1. A steam-trap comprising a valve having its operative portion adapted when open to lie in a plane inclined with respect to the floor of the structure upon which the valve is mounted, and a thermostatic device in operative relation to said valve and adapted to control the operation thereof.

2. In a steam-trap, in combination, a valve, and an inclined thermostat for operating the same a portion of which is directly below said valve.

3. In apparatus of the class described, in combination, a structure, piping upon said structure, and a steam-trap connected with said piping, said steam-trap comprising a valve and a thermostat mounted in a position inclined with respect to the floor of said structure.

4. In a steam-trap, in combination, piping, a casing, a thermostat adjacent said casing, and a valve adapted to swing about a point above the same controlling communication between said piping and said casing and adapted to be controlled by said thermostat.

5. In apparatus of the class described, in combination, a structure, piping mounted upon said structure, a steam-trap connected with said piping, said steam-trap comprising a valve adapted to swing about a point above the same, and a thermostatic device adapted for operating said valve.

6. In a steam-trap, in combination, a valve, and a thermostat for operating and controlling the same a portion of which is below said valve and a portion of which is at one side thereof, the operative portion of said valve being in an inclined position.

7. In a steam-trap, in combination, a valve and a thermostat for controlling said valve and located in the path of drainage of said valve, the operative portion of said valve being in an inclined position.

8. In apparatus of the class described, in combination, a structure, piping mounted upon said structure, and a steam-trap connected with said piping, said steam-trap comprising a thermostat and a valve operatively connected therewith, and said thermostat and valve being inclined with respect to the floor of the structure.

9. In apparatus of the class described, in combination, a steam-trap comprising a valve and a thermostat mounted in the path of discharge of said valve, said thermostat and the operative portion of said valve being in positions inclined with respect to the floor of the structure upon which the trap is mounted.

10. A steam-trap comprising, in combination, a pivotally-mounted valve having its operative portions in a plane inclined with respect to the structure upon which the trap is mounted, and a thermostatic device by means of which said valve is opened and closed.

11. A steam-trap comprising a pivotally-mounted valve, an inclined valve-seat adapted to coact therewith, said valve capable of being opened by gravity, and a device controlled by the temperature of the fluid passing through said trap adapted to operate said valve.

12. In a steam-trap, in combination, a valve adapted to swing about a point above the same, a valve-seat having its operative portions inclined and adapted to coact with said valve, and thermostatic means for controlling said valve.

13. In apparatus of the class described, in combination, a structure, piping mounted upon said structure, and a steam-trap connected with said piping, said steam-trap comprising a valve adapted to swing about a point above the same, a valve-seat adapted to coact with said valve and having its operative portions inclined with respect to the floor of the said structure, and thermostatic means free from said valve but adapted to engage the same and control the operation thereof.

14. In a steam-trap, in combination, a swinging valve, an inclined valve-seat adapted to coact therewith, a thermostat, and means adapted simultaneously to adjust the position of said thermostat and the play of said valve.

15. In a steam-trap, in combination, two relatively detachable members, a swinging valve mounted upon one of said members, a valve-seat upon said member having its operative portions inclined and adapted to coact with said valve, a thermostat mounted upon the other of said members, and means adapted simultaneously to adjust the position of said thermostat and the play of said valve.

16. A steam-trap comprising a valve adapted to swing about a point above the same, and a thermostat for controlling the same positioned in the path of the drainage of said valve.

17. In a steam-trap, in combination, a valve adapted to swing about a point above the same, and an inclined thermostat positioned in the path of the drainage of said valve.

18. In apparatus of the class described, in combination, a structure, piping mounted upon said structure, and a steam-trap connected with said piping, said steam-trap comprising a valve adapted to swing about a point above the same, and a thermostat inclined with respect to the floor of said structure and positioned in the path of drainage discharged by said valve.

19. In a steam-trap, in combination, a valve, an inclined thermostat positioned within the path of drainage discharged by said valve, and means adapted simultaneously to adjust the position of said thermostat and the play of said valve.

20. In a steam-trap, in combination, a pivotally-mounted valve, an inclined valve-seat adapted to coact therewith, and a thermostat operatively connected with said valve and positioned within the path of drainage discharged by said valve.

21. In a steam-trap, in combination, a valve adapted to swing about a point above the same, an inclined valve-seat adapted to coact with said valve, and a thermostat operatively connected with said valve and positioned within the path of drainage discharged by the same.

22. In a steam-trap, in combination, a valve adapted to swing about a point above the same, an inclined valve-seat adapted to coact therewith, and an inclined thermostat positioned within the path of drainage discharged by said valve.

23. In apparatus of the class described, in combination, a structure, piping mounted upon said structure, and a steam-trap operatively connected with said piping, said steam-trap comprising a valve adapted to swing about a point above the same, a valve-seat inclined with respect to the floor of said structure and adapted to coact with said valve, and a thermostat operatively connected with said valve and positioned within the path of drainage discharged thereby.

24. In a steam-trap, in combination, two relatively detachable members, a valve mounted upon one of said members, an inclined valve-seat upon the same member, and adapted to coact with said valve, and a thermostat mounted upon the other of said members and positioned within the path of drainage discharged by said valve.

25. In a steam-trap, in combination, two relatively detachable members, a valve mounted upon one of said members, an inclined valve-seat upon the same member and adapted to coact with said valve, and an inclined thermostat detachably mounted upon the other of said members and positioned within the path of drainage discharged by said valve.

26. In a steam-trap, in combination, two relatively detachable members, a valve mounted upon one of said members, an inclined valve-seat upon the same member and adapted to coact with said valve, a thermostat mounted upon the other of said members and within the path of drainage discharged by said valve, and means adapted simultaneously to adjust the position of said thermostat and the play of said valve.

27. In a steam-trap, in combination, two relatively detachable members, a valve pivotally mounted upon one of said members, an inclined valve-seat upon the same member adapted to coact with said valve, and a thermostat upon the other of said members having an operative connection with said valve and positioned within the path of drainage discharged thereby.

28. In a steam-trap, in combination, two relatively detachable members, a valve mounted upon one of said members and adapted to swing about a point above the same, an inclined valve-seat upon the same member, and adapted to coact with said valve, and a thermostat upon the other of said members and operatively connected with said valve and positioned within the path of drainage discharged thereby.

29. In a steam-trap, in combination, two relatively detachable members, a valve mounted upon one of said members and adapted to swing about a point above the same, and a thermostat mounted upon the other of said members and operatively connected with said valve and positioned within the path of drainage discharged thereby.

30. In a steam-trap, in combination, two relatively detachable members, a valve pivotally mounted upon one of the same, an inclined valve-seat upon the same member adapted to coact with said valve, and a thermostat mounted upon the other of said members having an operative connection with said valve and positioned within the path of drainage discharged thereby.

31. In a steam-trap, in combination, two relatively detachable members, a valve mounted upon one of said members and adapted to swing about a point above the same, an inclined valve-seat upon the said member and adapted to coact with said valve, and a thermostat mounted upon the other of said members having an operative connection with said valve and positioned within the path of drainage discharged thereby.

32. In a steam-trap, in combination, two relatively detachable members, a valve mounted upon one of said members and adapted to swing about a point above the same, an inclined valve-seat upon the same member adapted to coact with said valve, a thermostat upon the other of said members having an operative connection with said valve and positioned within the path of drainage discharged thereby and means adapted simultaneously to adjust the position of said thermostat and the play of said valve.

33. In a steam-trap, in combination, two relatively detachable interlocking members, a valve pivotally mounted upon one of said members and adapted to swing about a point above the same, an inclined valve-seat upon the same member adapted to coact with said valve, an inclined thermostat detachably mounted upon the other of said members having an operative connection with said valve and positioned within the path of drainage discharged thereby, and means adapted simultaneously to adjust the position of said thermostat and the play of said valve.

34. In apparatus of the class described, in combination, a service-pipe connection, a casing, an inclined valve-seat, a pivotally-mounted depending valve upon said casing adapted to coact with said valve-seat to control communication between said service-pipe connection and said casing, a cap detachably connected to said casing, and an inclined thermostat carried by said cap in the path of drainage discharged by said valve and adapted to control the operation thereof.

35. In apparatus of the class described, in combination, a service-pipe connection, a casing, an inclined valve-seat, a pivotally-mounted depending valve upon said casing adapted to coact with said valve-seat to control communication between said service-pipe connection and said casing, a cap detachably connected to said casing, and an inclined thermostat carried by said cap in the path of drainage discharged by said valve and adapted to control the operation thereof, said cap being provided with means adapted to adjust the position of said thermostat and the play of said valve.

36. A steam-trap comprising, in combination, a casing, a pivotally-mounted, gravity-operated valve mounted therein, and a thermostatic device adapted to control the operation of said valve.

37. A steam-trap comprising in combination a casing, a cap having one side thereof seated loosely in said casing, means for positively securing the opposite side of said cap to said casing, a gravity-operated valve mounted to swing within said casing, and a thermostatic device located in said casing and mounted upon said cap adapted to engage said valve and control the operation thereof.

38. A steam-trap comprising in combination a casing having a retaining-shoulder, a cap having one side thereof set behind said shoulder, a bolt for positively securing the opposite side of said cap to the casing, a gravity-operated valve mounted to swing within said casing, and a thermostatic device located within said casing and mounted upon said cap adapted to engage said valve and control the operation thereof.

In testimony whereof I affix my signature in the presence of two witnesses.

R. M. DIXON.

Witnesses:
A. C. MOORE,
C. H. WARFIELD.